(12) United States Patent
Wood et al.

(10) Patent No.: US 6,287,051 B1
(45) Date of Patent: Sep. 11, 2001

(54) FIXABLE SEAL SLUICE GATE

(76) Inventors: Jeffrey A. Wood, 2396 Ravenna Blvd., Unit 101, Naples, FL (US) 34109; Colin W. Bennett, 524 6th Concession Road West, Flamborough, Ontario (CA), L0R 1V0

( * ) Notice: Subject to any disclaimer, the term of this patent is extended or adjusted under 35 U.S.C. 154(b) by 0 days.

(21) Appl. No.: 09/460,506

(22) Filed: Dec. 14, 1999

(51) Int. Cl.[7] ................. E02B 7/26; E02B 7/54
(52) U.S. Cl. ............. 405/104; 405/105; 405/106; 405/87; 405/90; 405/80; 405/52; 251/326; 251/193; 277/609; 277/630
(58) Field of Search ................. 405/52, 80, 90, 405/104, 105, 106, 125; 251/326, 193; 277/609, 630

(56) References Cited

U.S. PATENT DOCUMENTS

| | | | |
|---|---|---|---|
| 3,784,158 | * | 1/1974 | Cave ............................. 405/106 |
| 3,907,250 | * | 9/1975 | Kane ............................. 251/193 |
| 4,028,896 | * | 6/1977 | Whipps ............................. 405/104 |
| 4,070,863 | * | 1/1978 | Brown ............................. 405/105 |
| 4,220,420 | * | 9/1980 | Aston et al. ............................. 405/104 |
| 4,265,564 | * | 5/1981 | Watelet ............................. 405/105 |
| 4,524,950 | * | 6/1985 | Vitas et al. ............................. 251/326 |
| 5,141,361 | * | 8/1992 | Fontaine ............................. 405/106 |
| 5,246,308 | * | 9/1993 | Brothers ............................. 405/53 |
| 5,613,806 | * | 3/1997 | House et al. ............................. 405/150.1 |
| 6,176,493 | * | 1/2001 | Whipps ............................. 277/630 |

FOREIGN PATENT DOCUMENTS

| | | | |
|---|---|---|---|
| 2140487-A | * | 5/1983 | (GB) ............................. E02B/8/04 |
| 357021612-A | * | 2/1982 | (JP) ............................. E02B/7/36 |
| 357044014-A | * | 3/1982 | (JP) ............................. E02B/7/36 |

* cited by examiner

Primary Examiner—Robert E. Pezzuto
Assistant Examiner—Alexandra K. Pechhold
(74) Attorney, Agent, or Firm—Merrill N. Johnson

(57) ABSTRACT

A fixable-seal sluice gate has a valve vise (18, 19, 25, 26, 31, 32) that forces a sluice-gate valve uniformly and tightly in sealing-surface contact with a domed seal ring (4) that is fixable conveniently and removably intermediate a sluice-gate plate (3) and a sluice-gate wall (1) of a sluice-gate flange that encompasses a valve side of a sluice-gate aperture (2). A plate locator on the valve vice sets the sluice-gate plate in predetermined sealing-contact position for select structure of the fixable-seal sluice gate. The domed seal ring is a plastic material such as Hypalon® having predetermined toughness to resist particle embedment in combination with having predetermined softness for select uses and objectives. A dome flange (5, 6) on one or both sides of a base of the domed seal ring is bracketed removably to optionally the sluice-gate wall or the sluice-gate plate for rigid, reliable, long-enduring and yet quick and convenient attachment and detachment of the domed seal ring.

15 Claims, 7 Drawing Sheets

FIXABLE SEAL SLUICE GATE

FIELD OF THE INVENTION

This invention relates to sluice gates or valves which have an outlet and/or inlet into a usually large container such as a reservoir, holding space or processing container in contrast to an in-line valve in a pipe or other tubular conveyance.

RELATION TO PRIOR ART

Currently, most known sluice gates employ brass plates that are forced against brass flanges with oppositely-tapered wedge extensions. These are so prone to leakage from imperfect fitting that regulatory structural standards permit relatively high levels of leakage with undesirable results. Various soft, rubberlike and fibrous seals and washers have not been successful because they have not been made removably fixable reliably and because particles in fluids for which sluice gates usually are used embed in them. Embedded particles often prevent sealing contact and increase instead of decrease leakage. In addition, there has not been an adequate valving vise to position sealing members of sluice gates in tightly sealing contact.

SUMMARY OF THE INVENTION

Objects of patentable novelty and utility taught by this invention are to provide a fixable-seal sluice gate which:

has a resilient seal that is fixable removably without being dislodged by harsh environments of rapid and turbulent flow of fluids that often contain sharp particles or abrasive sludge and yet can withstand constantly or changing high-pressure and low-pressure usage;

can be produced, installed, maintained and replaced quickly at low cost; and provides accurate and tight sealing contact of sealing members for sluice gates.

This invention accomplishes these and other objectives with a fixable-seal sluice gate having a valve vise that forces a valve plate uniformly and tightly in sealing-surface contact with a domed seal ring that is fixable conveniently and removably intermediate a sluice-valve plate and a sluice-gate wall of a sluice-gate flange that encompasses a valve end of a sluice-gate aperture. A plate locator on the valve vice sets the valve plate in predetermined sealing-contact position for select structure of the fixable-seal sluice gate. The domed seal ring is a plastic material such as Hypalon® having predetermined toughness to resist particle embedment in combination with having predetermined softness for select uses and objectives. A dome flange on one or both sides of a base of the domed seal ring is bracketed removably to either the sluice-gate wall or the sluice-gate plate for rigid, reliable, long-enduring and yet quick and convenient attachment and detachment of the domed seal ring. Sealing grooves and ridges on the sluice-gate wall or optionally on the sluice-gate plate are provided in relation to removable bracket attachment of the domed seal ring.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and list numbers assigned to them designate the same features throughout this description.

1. Sluice-gate wall
2. Sluice-gate aperture
3. Sluice-gate plate
4. Domed seal ring
5. Inside flange
6. Outside flange
7. Annular neck
8. Sealing dome -continued 9. Inside flange ring
10. Outside flange ring
11. Inside extension-flange ring
12. Outside extension-flange ring
13. Washer ring
14. Backup ridge
15. Annular seal groove
16. Linear slide
17. Linear-force rod
18. Wall bevel
19. Plate bevel
20. Wall-bevel edges
21. Plate-bevel edges
22. Slide support
23. Locator base
24. Base support
25. Locator gearing
26. Locator stem
27. Hand wheel
28. Locator beam
29. Pivot axle
30. Ball-and-socket joint
31. Pivot gearing
32. Pivot forcer
33. Seal-contact deflector
34. Plate deflectee
35. Arcuate seal corners
36. Arcuate flange corners
37. Concrete Reference is made first to FIGS. 1–8. A sluice-gate wall 1 such as a gate flange that encompasses a sluice-gate aperture 2, has an aperture axis to which the sluice-gate wall 1 is orthogonal. A sluice-gate plate 3 having a closure surface that is sized, shaped and structured to be juxtaposed to an arcuate sealing surface of a domed seal ring 4 which by being attached to either the sluice-gate wall 1 or to the sluice-gate plate 3, is fixable removably intermediate the sluice-gate wall 1 and the sluice-gate plate 3.

Figure 15:
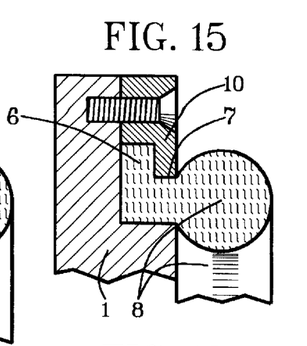
FIG. 15 is an enlarged partially cutaway side view in approximately actual size of a domed seal ring having an outside flange that is removably bracket-fastened to a seal-stepped sluice-gate wall with an outside flange ring that is separable from the sluice-gate wall.
Figure 16:
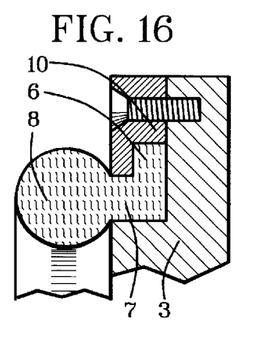
FIG. 16 is an enlarged partially cutaway side view in approximately actual size of a domed seal ring having an outside flange that is removably bracket-fastened to a seal-stepped sluice-gate plate with an outside flange ring that is separable from the sluice-gate plate.
Figure 17:
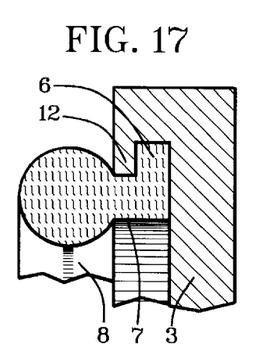
FIG. 17 is an enlarged partially cutaway side view in approximately actual size of a domed seal ring having an outside flange that is removably bracket-fastened to a seal-stepped sluice-gate plate with an outside flange ring that is an extension of the sluice-gate plate.
Figure 19:
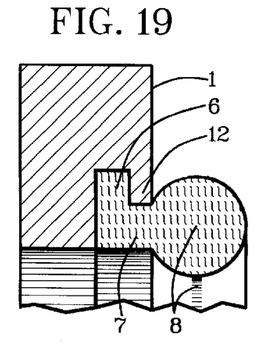
FIG. 19 is an enlarged partially cutaway side view in approximately actual size of a domed seal ring having an outside flange that is removably bracket-fastened adjacent to an inside periphery of a sluice-gate aperture to a sluice-gate wall with an outside flange ring that is an extension of the sluice-gate wall.
Figure 20:
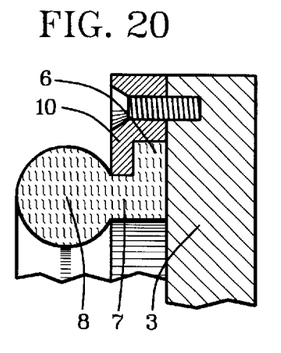
FIG. 20 is an enlarged partially cutaway side view in approximately actual size of a domed seal ring having an outside flange that is removably bracket-fastened to a flat, un-stepped sluice-gate plate with an outside flange ring that is separable from the sluice-gate plate.
Figure 21:
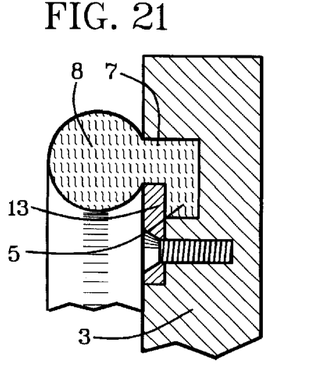
FIG. 21 is an enlarged partially cutaway side view in approximately actual size of a domed seal ring having an inside flange that is removably bracket-fastened to a double-stepped sluice-gate plate with an inside-flange washer ring.

Referring to FIGS. 9–21, the domed seal ring 4 has at least one dome flange such as an inside flange 5 and an outside flange 6 that are orthogonal to an annular neck 7 intermediate a sealing dome 8 and an annular base. As shown in FIGS. 9–14 and 21, the annular base can be a dual-flange base having both an inside flange 5 and an outside flange 6. Optionally as shown in FIGS. 15–17 and in FIGS. 19–20 the annular base can be a single-flange base having an outside flange 6, or as shown in FIG. 21, can be a single-flange base with an inside flange 5.

Overlaying the inside flange 5 and/or the outside flange 6 for attachment of the domed seal ring 4, at least one dome-flange bracket has optionally an inside flange ring 9 that is fastened to a sluice-gate member, an outside flange ring 10 that is fastened to the sluice-gate member, an inside extension-flange ring 11 that is an extension of the sluice-gate member, or an outside extension-flange ring 12 that is an extension of the sluice-gate member. The sluice-gate member is optionally the sluice-gate wall 1 or the sluice-gate plate 3.

Figure 18:
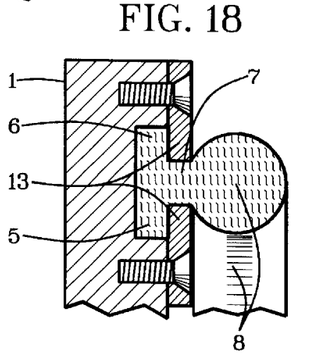
FIG. 18 is an enlarged partially cutaway side view in approximately actual size of a domed seal ring having a dual-flange base that is removably bracket-fastened to a sluice-gate wall with an inside-flange washer ring and an outside-flange washer ring.

The inside flange ring 9 and the outside flange ring 10 can be stepped as shown in FIGS. 9–16 and 20 or can be washer rings 13 that are flat as depicted in FIGS. 18 and 21. The sluice-gate wall 1 and the sluice-gate plate 3 can be flat-surfaced or stepped for receiving the inside flange 5, the outside flange 6, the inside flange ring 9, the outside flange ring 10 and/or the washer ring 13 as shown.

Figure 11:
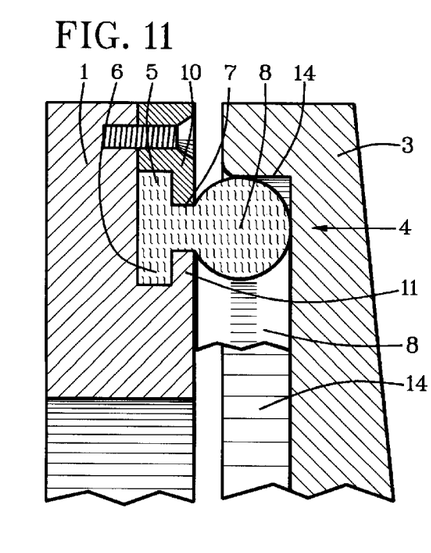
FIG. 11 is an enlarged partially cutaway side view in approximately actual size of a domed seal ring having a dual-flange base that is removably bracket-fastened to a sluice-gate wall with an inside-flange ring that is an extension of the sluice-gate wall as a sealing member and with an outside flange ring that is separable from the sluice-gate wall and, in addition, shows the sluice-gate plate with a sealing ridge for enhanced sealing.

Referring further to FIG. 11, a backup ridge 14 can be provided to encounter an outside of the sealing dome 8 that is attached to an oppositely disposed sluice-gate member. A first sealing member to which the domed seal ring 8 is bracket-fastened is either a sluice-gate wall 1 or a sluice-gate plate 3 that is disposed oppositely from a second sealing member on which the backup ridge 14 is provided. Although depicted in working relationship to a sealing dome 8 having both an inside flange 5 and an outside flange 6 on a sluice-gate wall 1, the seal ridge 14 is particularly advantageous for use with sealing domes 8 having only an inside flange 5 or an outside flange 6.

Figure 12:
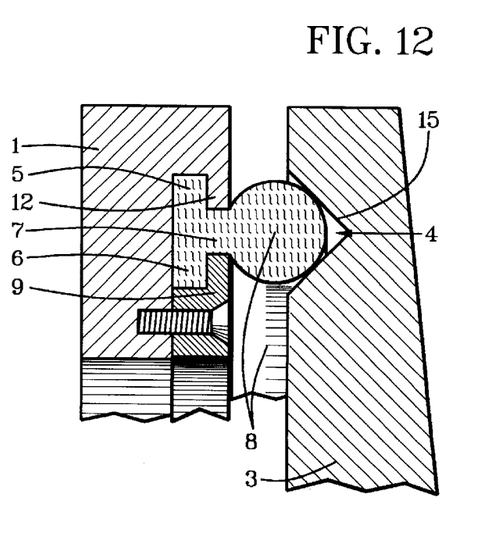
FIG. 12 is an enlarged partially cutaway side view in approximately actual size of a domed seal ring having a dual-flange base that is removably bracket-fastened to a sluice-gate wall with an outside flange ring that is an extension of the sluice-gate wall as a sealing member and with an inside-flange ring that is separable from the sluice-gate plate which, in addition, has a sealing groove for enhanced sealing.
Figure 13:
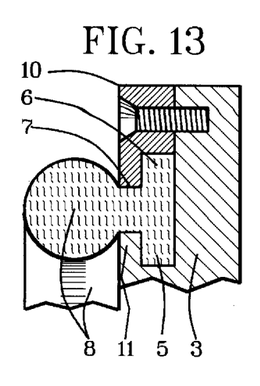
FIG. 13 is an enlarged partially cutaway side view in approximately actual size of a domed seal ring having a dual-flange base that is removably bracket-fastened to a sluice-gate plate with an inside-flange ring that is an extension of the sluice-gate plate as a sealing member and with an outside flange ring that is separable from the sluice-gate plate.
Figure 14:
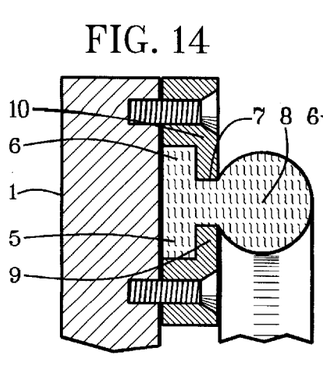
FIG. 14 is an enlarged partially cutaway side view in approximately actual size of a domed seal ring having a dual-flange base that is removably bracket-fastened to a flat, un-stepped sluice-gate wall with an inside-flange ring and an outside flange ring that are separable from a sealing member such as the sluice-gate plate or the sluice-gate wall.

Referring further to FIG. 12, an annular seal groove 15 with tapered walls can be provided for tangentially sealing contact with circumferential surfaces of the sealing dome 8 that is attached to an oppositely disposed sluice-gate member. The first sealing member to which the domed seal ring 8 is bracket-fastened is either a sluice-gate wall 1 or a sluice-gate plate 3 that is disposed oppositely from a second sealing member on which the annular seal groove 15 is provided.

Referring to all FIGS., the domed seal ring is preferably a plastic material having predetermined toughness to resist particle embedment and abrasion in combination with having predetermined softness for select sealing uses and objectives. A preferred candidate material for relatively severe use conditions is Hypalon®. For less sever use conditions, a soft, pliable and resilient sealing material can be employed. The inside extension-flange ring 11 and the outside extension-flange ring 12 require either a sufficiently resilient material to be stretched or a ring gap to be spread for positioning over bracket walls.

Figures 1, 2, 3:
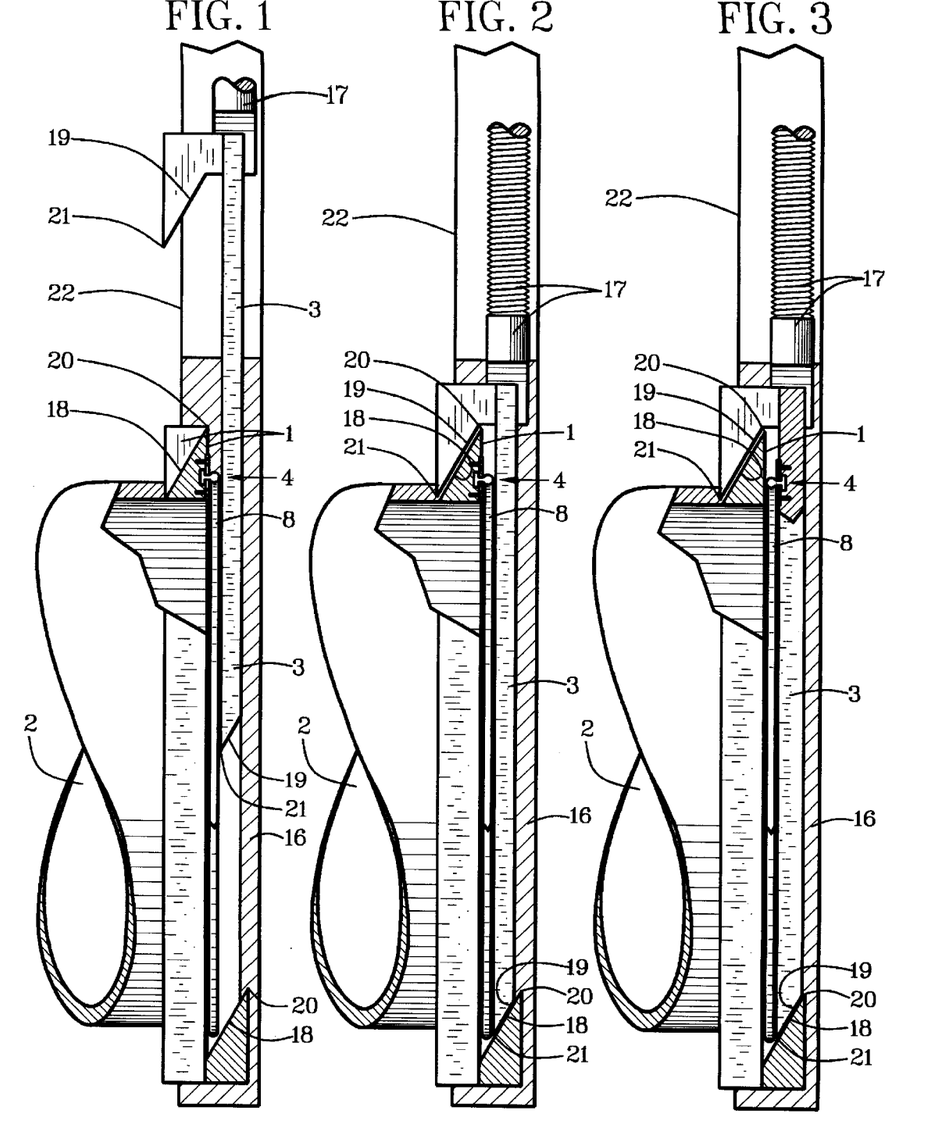
FIG. 1 is a partially cutaway side view of a domed seal ring bracket-fastened to a sluice-gate wall of a gate flange of a bevel-hook fixable-seal sluice gate having a plate locator that is lateral with bevel hooks in an open mode with plate bevels of a sluice-gate plate disengaged from wall bevels on a sluice-gate wall.
FIG. 2 is the FIG. 1 illustration with the bevel hooks engaged in a closed mode.
FIG. 3 is the FIG. 2 illustration with the domed seal ring bracket-fastened to the sluice-gate plate.

Referring further to FIGS. 1–3, a plate locator includes a linear slide 16 in which a sluice-gate plate 3 is slid laterally or orthogonally to the axis of the sluice-gate aperture 2 to set the sluice-gate plate 3 in predetermined sealing-contact position. A valve vice for this embodiment having a predetermined slide-gate structure of the fixable-seal sluice gate includes a lateral forcer with a linear-force rod 17 that actuates a plurality of bevel hooks having wall bevels 18 on the sluice-gate wall 1 in slidably wedging contact with plate bevels 19 on the sluice-gate plate 3. The wall bevels 18 are beveled in a direction away from the sluice-gate plate 3 and downward from wall-bevel edges 20 on the sluice-gate wall 1. Correspondingly opposite, the plate bevels 19 are beveled in a direction away from the sluice-gate wall 1 and upward from plate-bevel edges 21 on the sluice-gate plate 3.

The linear-force rod 17 of the lateral forcer is anchored with a slide support 22 that is lateral-force anchorage common to anchorage of the sluice-gate wall 1, lateral-force anchorage of the lateral forcer being orthogonal to the axis of the sluice-gate aperture 2. The linear-force rod 17 is assumed to have whatever manual and/or motorized pressure and/or gearing that is appropriate and available for predetermined use conditions and related requirements. Not shown but foreseeable as a candidate lateral forcer is a hand wheel with which a machine-threaded linear-force rod 17 is rotated in a machine-threaded base for raising and lowering the sluice-gate plate 3.

The plurality of bevel hooks can be three with one at a top and one on each side at 120 degrees apart circumferentially to provide coplanar staggering if preferred instead of parallel-plane staggering as shown for bottom hooks to miss top hooks in vertical travel of the sluice-gate plate 3.

Figures 4, 5:
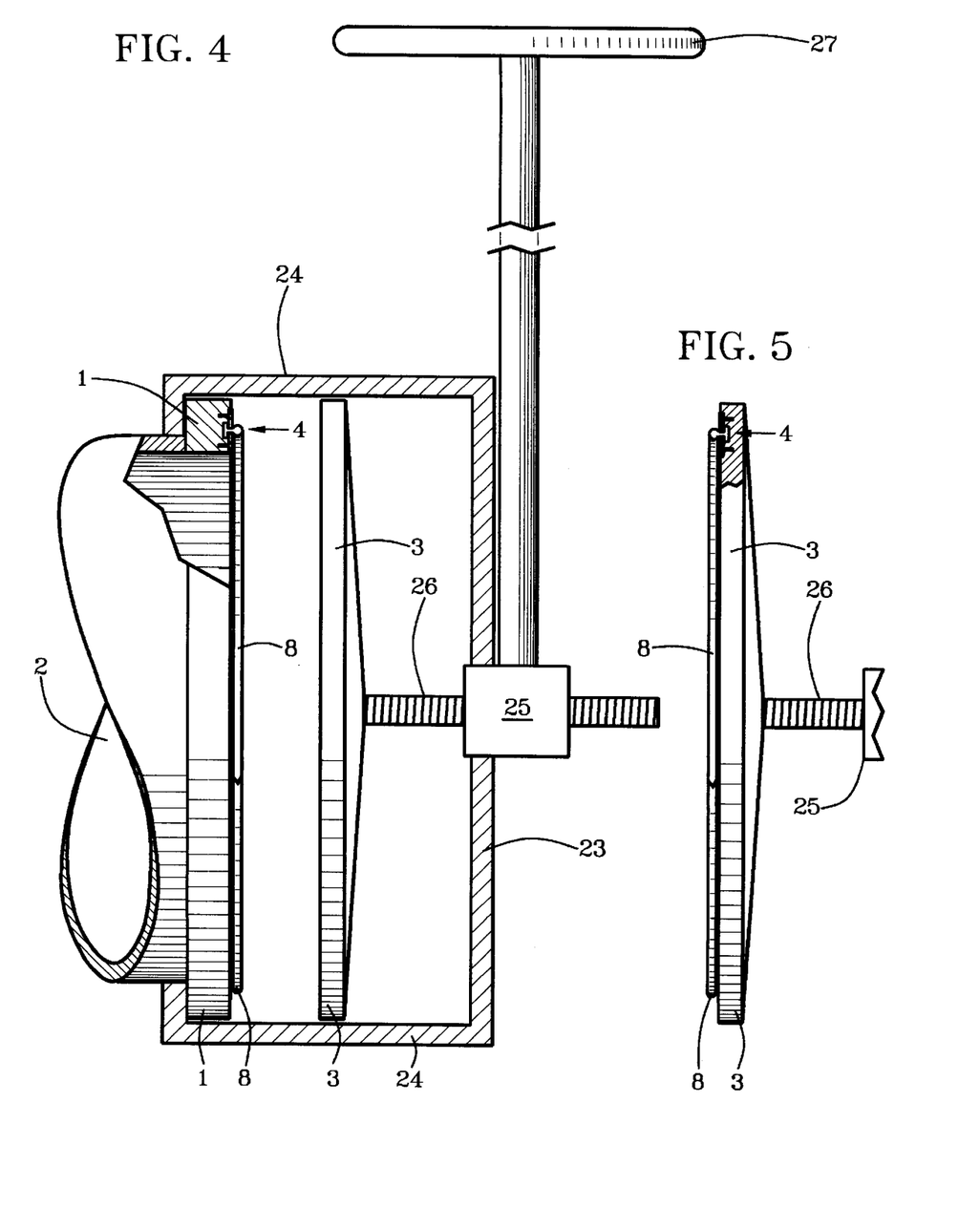
FIG. 4 is a partially cutaway side view of a domed seal ring bracket-fastened to a sluice-gate wall of a gate flange of a fixable-seal sluice gate having a plate locator that is linear to an axis of a sluice-gate aperture.
FIG. 5 is a partially cutaway side view of the domed seal bracket-fastened to a sluice-gate plate of the FIG. 4 illustration.

Referring further to FIGS. 4–5, the plate locator can be linear with a locator base 23 on at least one base support 24 extended colinearly to the axis of the sluice-gate aperture 2 for a predetermined distance from a gate-plate side of the sluice-gate wall 1 to which the base support 24 is affixed.

The valve vice is a linear forcer with the locator base 23 having orthogonally locator gearing 25 with which a locator stem 26 having machine threading is actuated linearly through an operator rod having a predetermined power input such as a hand wheel 27 and/or motorized rotation. The sluice-gate plate 3 is attached orthogonally to a gate-wall end of the locator stem 26. The linear forcer and the sluice-gate wall 1 have common anchorage through the base support 24.

Figure 6:
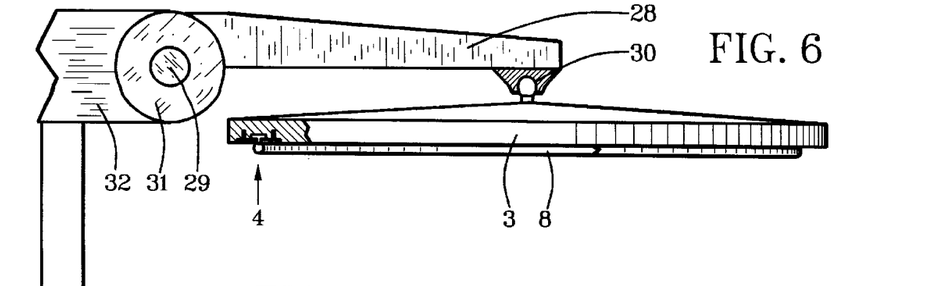
FIG. 6 is a partially cutaway side view of a domed seal ring bracket-fastened to a sluice-gate plate in open mode of a fixable-seal sluice gate having a plate locator that is pivotal to the axis of the sluice-gate aperture.
Figures 7, 8:
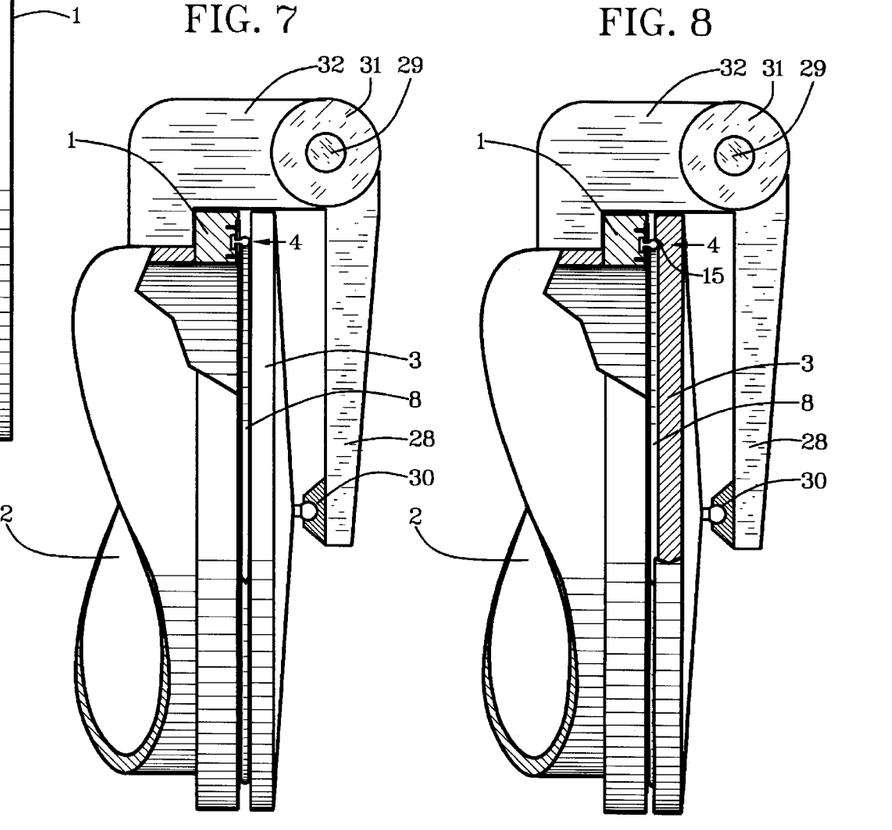
FIG. 7 is a partially cutaway side view of a domed seal ring bracket-fastened to a sluice-gate wall with the sluice-gate plate in closed mode of the FIG. 6 fixable-seal sluice gate.
FIG. 8 is the FIG. 7 illustration with a sluice-gate plate having a beveled groove in which the domed seal ring is positioned for enhanced sealing.
Figure 9:
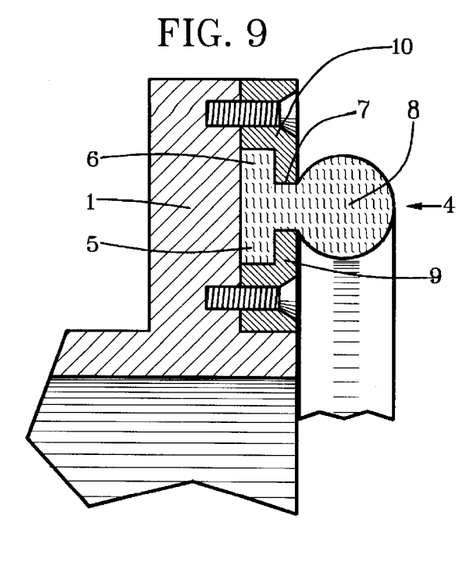
FIG. 9 is an enlarged partially cutaway side view in approximately actual size of a domed seal ring having a dual-flange base that is removably bracket-fastened to a sluice-gate wall with an inside-flange ring and an outside flange ring that are separable from a sealing member such as the sluice-gate plate or the sluice-gate wall.
Figure 10:
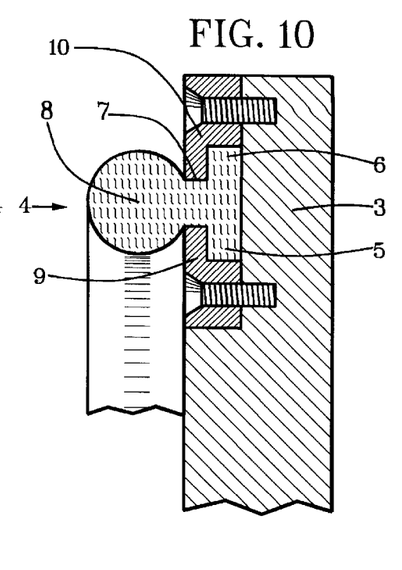
FIG. 10 is an enlarged partially cutaway side view in approximately actual size of the FIG. 9 domed seal ring removably bracket-fastened to a sluice-gate plate having a seating step with the inside-flange ring and the outside flange ring that are separable from other sealing members.

Referring further to FIGS. 6–8, the plate locator can be pivotal to the aperture axis with a locator beam 28 that is pivotal on a pivot axle 29 having a pivot axis that is orthogonal to the axis of the sluice-gate aperture 2 and positioned on a pivot housing that is proximate an outside periphery of the sluice-gate wall 1. The sluice-gate plate 3 is pivotal limitedly on ball-and-socket joint 30 on the locator beam 28 for allowing coplanar positioning of the sluice-gate plate 3 and the domed seal ring 4 on the sluice-gate wall 1 from a pivotal position. The valve vice has pivot gearing 31 with which the locator beam 28 is pivoted selectively intermediate open-mode linearity and closed-mode orthogonality to the axis of the sluice-gate aperture 2 with manual and/or motorized force applied at a pivot forcer 32 to the pivot gearing 31. The locator beam 28 and the sluice-gate wall 1 have common anchorage through housing of the pivot forcer 32.

Shown also in FIG. 8 is the annular seal groove 15 described in relation to FIG. 12.

Figure 22:
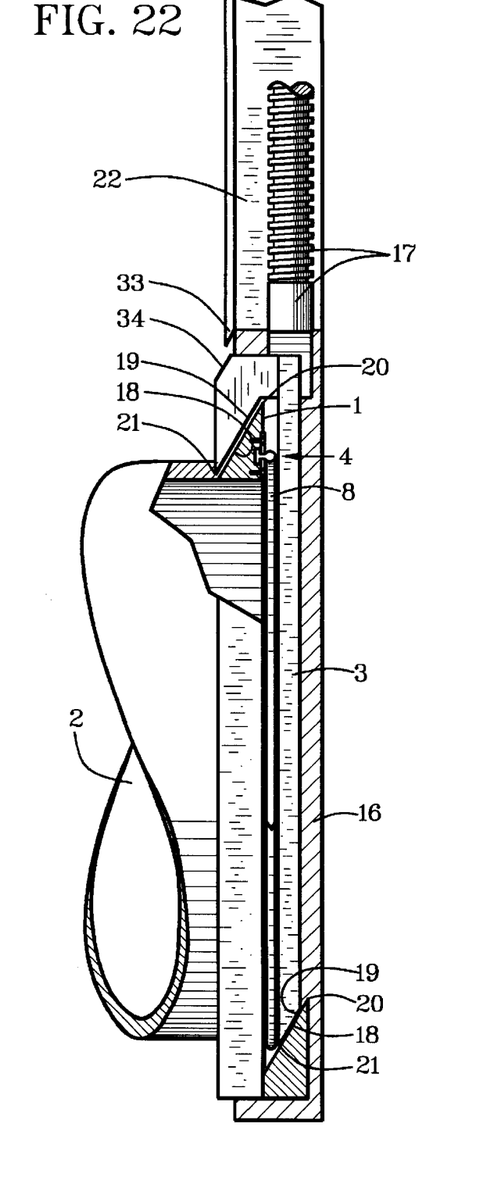
FIG. 22 is a the FIG. 1 illustration with a seal-contact deflector to prevent sliding contact of a sluice-gate plate with the sealing dome.
Figure 23:
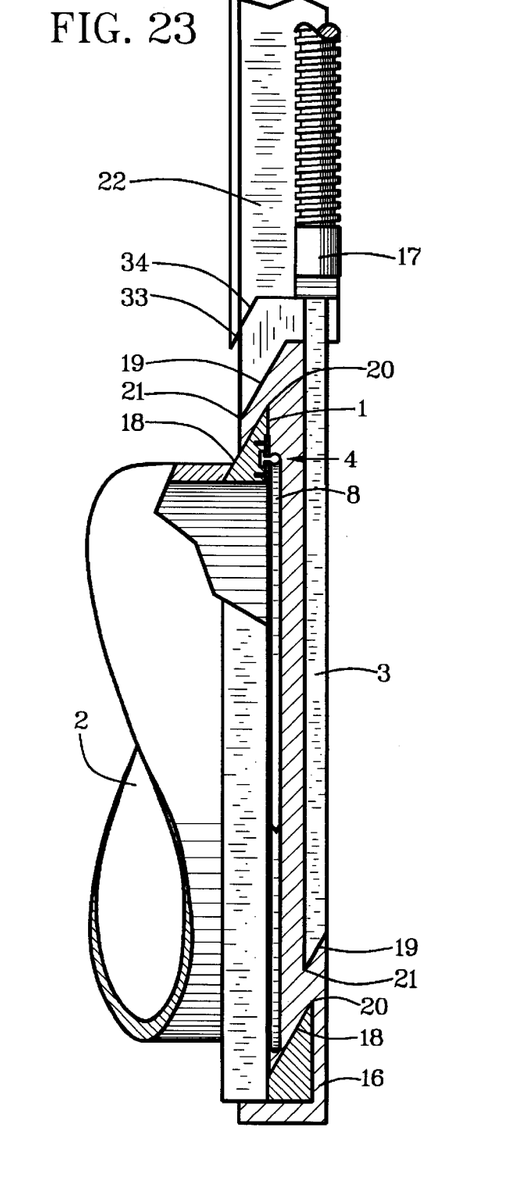
FIG. 23 is the FIG. 22 illustration with the sluice-gate plate partly raised without contacting the sealing dome.
Figure 24:
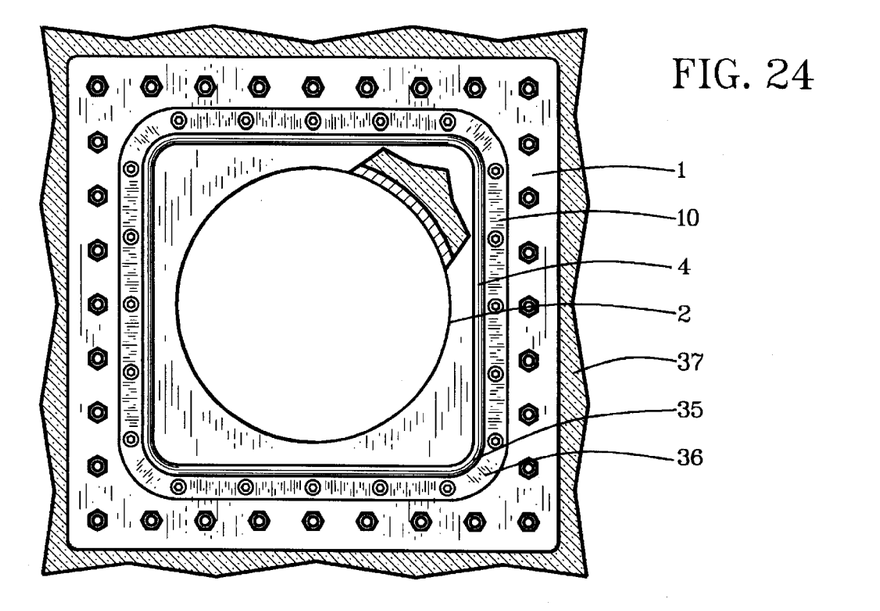
FIG. 24 is a partially cutaway front view of a rectangular sluice-gate wall having a domed seal ring that is rectangular with arcuate corners and is contained by an outside flange ring that is rectangular with arcuate corners.

Referring to FIGS. 1–3 and 22–23, the sluice-gate plate 3 can be prevented from having sliding contact with the sealing dome 8 of the domed seal ring 4 with a seal-contact deflector 33 positioned on the slide support 22 for contact with a plate deflectee 34 on the sluice-gate plate 3 when the sluice-gate plate 3 is being raised or lowered as depicted in FIGS. 22–23. A gap between the sealing dome 8 and the sluice-gate plate 3 can be narrow for small sluice gates and wide for large sluice gates, or whatever is required for preventing sliding contact for a particular size and type of sliding sluice-gate plate 3. Although shown as a matching-bevel members, leading-contact portions of either the seal-contact deflector 33 or the plate deflectee 34 can have rollers or other guide members positioned for a similar deflective action.

Referring to FIGS. 9–21 and 24, a sluice-gate 1 that is rectangular preferably has a domed seal ring 4 that is rectangular with arcuate seal corners 35 and is contained by the outside flange ring 10 and/or the inside flange ring 9 that are rectangular with arcuate flange corners 36. The sluice gate 1 is seated in concrete 37.

Referring to FIGS. 1–3 and 25, the sluice-gate 1 can be circular and have a domed seal ring 4 that is circular and contained by the outside flange ring 10 and/or the inside flange ring 9 that are circular.

Figures 25, 26:
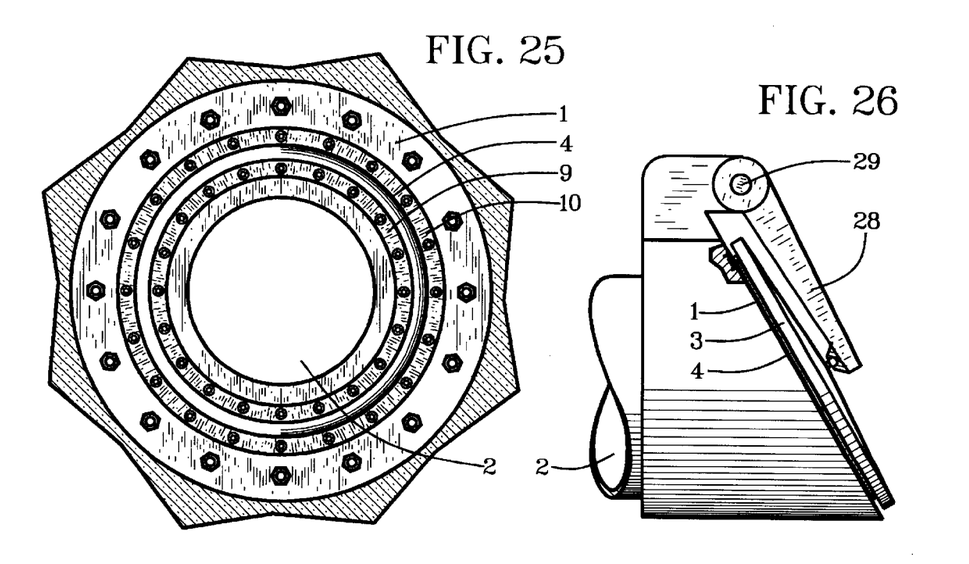
FIG. 25 is a front view of a circular sluice-gate wall having a domed seal ring contained by an outside flange ring and an inside flange ring that are circular.
FIG. 26 is a partially cutaway side view of a circular sluice-gate plate on a locator beam that is pivotal on a pivot axle to close a sluice-gate wall that is slanted.

Referring to FIG. 26, a sluice-gate plate 1 on one or more pivot members such as the locator beam 28 can be pivotal on an axis such as the pivot axle 29 for a sluice gate that is slanted as depicted in FIG. 26 or otherwise oriented.

This fixable-seal sluice gate is intended for sluice-gate apertures 2 with cross sections ranging from inches to tens-of-feet and having sluice-gate plates 3 that are positioned in sealing contact with sluice-gate walls 1 laterally, pivotally or linearly.

A new and useful fixable-seal sluice gate having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A flexible-seal sluice gate comprising:
   a sluice-gate wall that encompasses a sluice-gate aperture;
   the sluice-gate aperture having an aperture axis to which the sluice-gate wall is orthogonal;
   a sluice-gate plate having a closure surface that is sized, shaped and structured to be juxtaposed to an arcuate sealing surface of a domed seal ring that is positioned removably intermediate the sluice-gate wall and the sluice-gate plate;
   the domed seal ring having at least one dome flange that is disposed oppositely from a domed sealing surface on the domed sealing ring;
   the at least one dome flange bracket having at least one bracket plate that overlays the dome flange to fasten the at least one domed seal ring removably intermediate the sluice-gate wall and the sluice-gate plate;
   a plate locator that is structured to set the sluice-gate plate in predetermined sealing-contact for predetermined structure of the flexible-seal sluice gate; and
   a valve vice having structure for forcing the sluice-gate plate in a direction towards the sluice-gate wall for a closed mode and for moving the sluice-gate plate in a direction away from the sluice-gate wall for an open mode of the predetermined structure of the flexible-seal sluice gate and wherein the plate locator is lateral to the aperture axis with a plurality of bevel hooks;
   the bevel hooks have wall bevels on the sluice-gate wall and plate bevels on the sluice-gate plate;
   the wall bevels are beveled in a direction away from the sluice-gate plate and downward from wall-bevel edges on the sluice-gate wall;
   the plate bevels are beveled in a direction away from the sluice-gate wall and upward from gate-bevel edges on the sluice-gate plate;
   the valve vice is a lateral forcer having lateral-force anchorage that is common to anchorage of the sluice-gate wall, and
   the lateral-force anchorage of the lateral forcer is orthogonal to the axis of the sluice-gate aperture.

2. A flexible-seal sluice gate as described in claim 1 wherein:
   the domed seal ring is annular with an annular neck intermediate a sealing dome and an annular base that is orthogonal to the annular neck;
   the at least one dome flange is a dual-flange base having an inside flange and an outside flange that are extended orthogonally to the annular neck; and
   the at least one dome-flange bracket has an inside flange ring and an outside flange ring that are fastened to a sluice-gate member to bracket-fasten the dual-flange base for fastening the domed seal ring to the sluice-gate member.

3. A flexible-seal sluice gate as described in claim 2 wherein:
   the sluice-gate member is the sluice-gate wall.

4. A flexible-seal sluice gate as described in claim 2 wherein:
   the sluice-gate member is the sluice-gate plate.

5. A flexible-seal sluice gate as described in claim 1 wherein:
   the domed seal ring is annular with an annular neck intermediate a sealing dome and an annular base that is orthogonal to the annular neck;
   the at least one dome flange is an outside-flange base having an outside flange extended orthogonally to the annular neck; and
   the at least one dome-flange bracket has an outside flange ring that is fastened to a sluice-gate member to bracket-fasten the outside-flange base for fastening the domed seal ring to the sluice-gate member.

6. A flexible-seal sluice gate as described in claim 5 wherein:
   the sluice-gate member is the sluice-gate wall.

7. A flexible-seal sluice gate as described in claim 5 wherein:
   the sluice-gate member is the sluice-gate plate.

8. A flexible-seal sluice gate as described in claim 1 wherein:
   the domed seal ring is annular with an annular neck intermediate a sealing dome and an annular base that is orthogonal to the annular neck;
   the at least one dome flange is a dual-flange base having an inside flange and an outside flange that are extended orthogonally to the annular neck; and
   the at least one dome-flange bracket has an inside flange ring that is an extension of a sluice-gate member and has an outside flange ring that is fastened to the sluice-gate member to bracket-fasten the dual-flange base for fastening the domed seal ring to the sluice-gate member.

9. A flexible-seal sluice gate as described in claim 8 wherein:
   the sluice-gate member is the sluice-gate wall.

10. A flexible-seal sluice gate as described in claim 1 wherein:
    the domed seal ring is annular with an annular neck intermediate a sealing dome and an annular base that is orthogonal to the annular neck;
    the at least one dome flange is a dual-flange base having an inside flange and an outside flange that are extended orthogonally to the annular neck; and
    the at least one dome-flange bracket has an outside flange ring that is an extension of a sluice-gate member and has an inside flange ring that is fastened to the sluice-gate member to bracket-fasten the dual-flange base for fastening the domed seal ring to the sluice-gate member.

11. A flexible-seal sluice gate as described in claim 10 wherein:
    the sluice-gate member is the sluice-gate wall.

12. A flexible-seal sluice gate as described in claim 1 wherein:
    the domed seal ring is annular with an annular neck intermediate a sealing dome and an annular base that is orthogonal to the annular neck;
    the at least one dome flange is an outside-flange base having an outside flange extended orthogonally to the annular neck; and
    the at least one dome-flange bracket has an outside flange ring that is an extension of a sluice-gate member to bracket-fasten the outside-flange base for fastening the domed seal ring to the sluice-gate member.

13. A flexible-seal sluice gate as described in claim 12 wherein:
    the sluice-gate member is the sluice-gate plate.

14. A flexible-seal sluice gate as described in claim 1 wherein the plate locator is linear to the aperture axis with a locator base on at least one base support extended collinearly to the axis of the sluice-gate aperture for a predetermined distance from a gate-plate side of the sluice-gate wall to which the base support is affixed;

the locator base has locator gearing with which a locator stem is actuated linearly; the sluice-gate plate is attached orthogonally to a gate-wall end of the locator stem; and the valve vice is a linear forcer having linear-force anchorage that is common to the anchorage of the sluice-gate wall.

15. A flexible-seal sluice gate as described in claim 1 wherein:

the plate locator is pivotal to the aperture axis with a locator beam that is pivotal on a pivot axle having a pivot axis that is orthogonal to the axis of the sluice-gate aperture and positioned on a pivot housing that is proximate an outside periphery of the sluice-gate wall;

the sluice-gate plate is pivotal on a ball-and-socket joint on the locator beam;

the valve vice is a pivot forcer having pivotal-force anchorage that is common to the anchorage of the sluice-gate wall;

the pivot forcer has pivot gearing with which the locator beam is pivoted selectively intermediate linearity and orthogonality to the aperture axis;

the sluice-gate plate is positioned in an open mode with the locator beam oriented in a direction of linearity to the aperture axis; and the sluice-gate plate is positional in a closed mode with the locator beam oriented orthogonally to the aperture axis.

* * * * *